United States Patent

Birkle et al.

[11] Patent Number: 5,186,803
[45] Date of Patent: Feb. 16, 1993

[54] DEVICE FOR ELECTROLYTIC SURFACE TREATMENT OF BULK MATERIAL

[75] Inventors: Siegfried Birkle, Höchstadt/Aisch; Jürgen Fischer, Bergisch Gladbach; Johann Gehring, Spardorf, all of Fed. Rep. of Germany

[73] Assignee: Siemens Aktiengesellschaft, Berlin & Munich, Fed. Rep. of Germany

[21] Appl. No.: 752,675
[22] PCT Filed: Feb. 21, 1990
[86] PCT No.: PCT/EP90/00296
  § 371 Date: Nov. 6, 1991
  § 102(e) Date: Nov. 6, 1991
[87] PCT Pub. No.: WO90/10740
  PCT Pub. Date: Sep. 20, 1990

[30] Foreign Application Priority Data

Mar. 6, 1989 [EP] European Pat. Off. ........ 89103917.4

[51] Int. Cl.⁵ ............................................. C25D 17/28
[52] U.S. Cl. ...................................................... 204/201
[58] Field of Search ........................................ 304/201

[56] References Cited

U.S. PATENT DOCUMENTS 4,969,985 11/1990 Birkle .................................. 204/201

Primary Examiner—T. M. Tufariello
Attorney, Agent, or Firm—Kenyon & Kenyon

[57] ABSTRACT

For electrodeposition of metal from an electrolyte with a vibrator conveyor the bulk material is transported in a conveying trough which is connected as cathode. According to the invention, the conveying trough (18) is provided with supporting stringpieces (22 to 29) which are intended for the mechanical attachment of the conveying trough (18) on the central pipe (2) as well as for current transmission to the cathode and furthermore serve as electric lead-through through the sidewall (5) of the central pipe (2). The supporting stringpieces (22 to 29) comprise an electrically conducting contact shaft (52) which is electrically insulated from the electrolyte (12) and the central pipe (2). For the attachment of the conveying trough (18) on the stringpieces (22 to 29) contact bolts (56 to 58) are provided which serve at the same time for current transmission from the contact shaft (52) to the bulk material (20). In this form realization one obtains a simple current supply to the cathode.

5 Claims, 2 Drawing Sheets

DEVICE FOR ELECTROLYTIC SURFACE TREATMENT OF BULK MATERIAL

BACKGROUND OF THE INVENTION

The invention relates to a device for the electrolytic surface treatment of bulk material, preferably for electrodeposition of metal from an electrolyte, with a vibrator conveyor whose conveying trough is connected to a central pipe. The conveying trough of the vibrator conveyor is arranged spirally around the central pipe and surrounded by a vessel which is provided with at least one feed and one discharge shaft for the bulk material. This vessel contains the electrolyte, into which the vibrator conveyor with the central pipe dips partially.

Since in the surface coating of bulk material with aluminum the access of air and atmospheric moisture to the electrolyte brings about a considerable reduction of the conductivity and useful life, the electroplating must be carried out in an apparatus operating under exclusion of air. In order that access of air can be prevented also during loading and unloading of this apparatus operating under exclusion of air, also feed and discharge locks are required, which may be designed as gas locks, as liquid locks, or as combined gas-liquid locks.

In a known device for mass electroplating of metal, a vibrator conveyor with a horizontal and a vertical oscillation component is provided for the transport of the bulk material through the treatment bath. Utilizing the forces of gravity, this vibrator conveyor transports the bulk material in a spiral conveying trough in ascending direction around a column type central pipe connected with the conveying trough. The conveyor together with the support column is lodged in a gasproof vessel containing an electrolyte into which the central pipe with the conveying trough dips partially. As drive means serve for example oblique-action vibrators or obliquely set rods. By such drives oscillations are caused in such a way that the bulk material is transported periodically with the oscillation, gaining height in transport direction through thee electrolyte. Such vibrator conveyors require relatively little drive force and permit gentle conveyance of the bulk material. Intensive movement and good electrolyte exchange as well as uniform current consumption over the entire effective surface of the spread-out bulk material are obtained. The conveying trough of the vibrator conveyor can be made to oscillate via the central pipe, which is connected with the oscillation drive. The central pipe then fulfills, in addition to the transmission of oscillation, also the task of a supporting structure for the conveying trough. The trough, leading spirally upward around the central pipe, is secured in an especially simple and space-saving manner on the centered central pipe. The oscillation excitation then occurs at little cost through an oscillation drive which is disposed above or below the central pipe. Current supply to the cathode occurs inside the central pipe, while the current to the anode is supplied through the vessel wall U.S. Pat. No. 4,670,120.

SUMMARY OF THE INVENTION

It is now the object of the invention to state an especially simple form of realization of a current supply to one of the electrodes, preferably the cathode.

According to the invention this problem is solved with the characterizing features of claim 1. These supporting stringpieces form at the same time a mechanical retention for the conveying trough and an electric power lead to the bulk material constituting the cathode. The contact screws inserted into the stringpiece form a mechanical connection between the stringpieces and the conveying trough 2 as well as a current transmission to the bulk material connected as cathode or as cathode.

BRIEF DESCRIPTION OF THE DRAWINGS

For further elucidation of the invention reference is made to the drawing, in FIG. 1 of which a device for electrolytic surface coating of bulk material is illustrated schematically as a section.

DETAILED DESCRIPTION OF THE INVENTION

Figure 1:
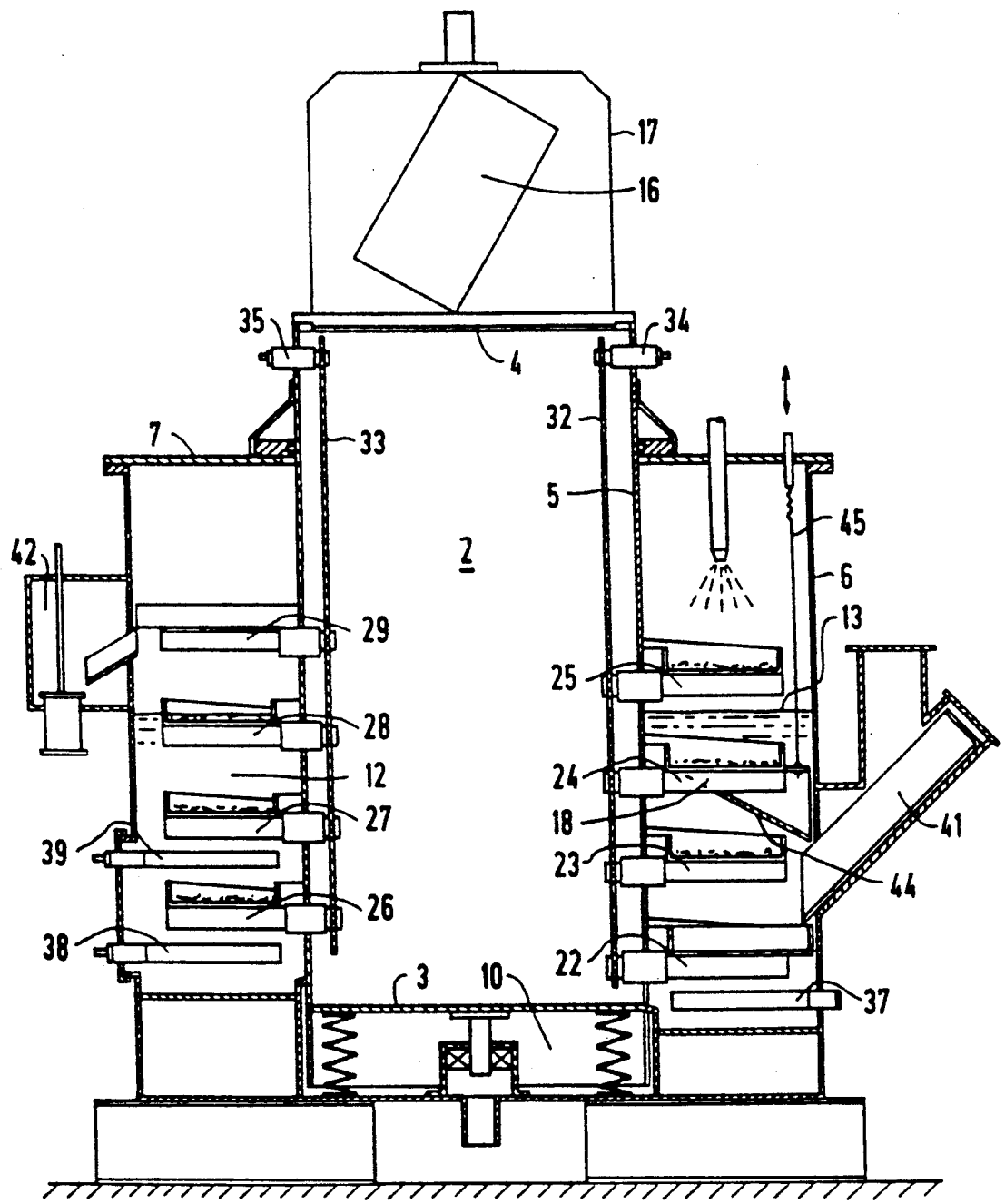

A device for electrolytic surface treatment of metallic bulk material, for example for the electrodeposition of aluminum from aprotic aluminum-organic electrolytes free of oxygen and water, according to FIG. 1, comprises a central pipe 2 with a bottom 3 and a cover 4 as well as a hollow-cylindrical sidewall 5. The central pipe 2 protrudes from a vessel 6, the cover 7 of which is connected gasproof with the central pipe 2 via a sealing bellows. A gas cushion 10 is enclosed in the manner of a diving bell by the bottom 3 of the central pipe 2 and by a hollow-cylindrical extension not specifically indicated in the figure. The central pipe 2 dips partially into an electrolyte 12, the upper level of which, marked 13, is indicated dashed in the figure, The electrolyte 12 may be for example an aprotic aluminum-organic electrolyte free of oxygen and water. Above the cover 4 of the central pipe 2 and hence outside of the central pipe 2 and also outside of the vessel 6 an oscillating drive 16 is arranged, only symbolized in the figure, which is secured on a bearing block 17 and is relatively freely accessible. This oscillating drive 16 brings about in conjunction with a mechanism not shown in the figure an oscillating movement of the central pipe 2 and hence of a conveying trough 18, which is arranged spirally around the central pipe 2. The conveying trough 18 contains a bulk material 20 intended to be coated, which is transported inside the conveying trough 18 in the electrolyte 12 and is electrically contacted during the transport. The conveying trough 18 is secured on supporting stringpieces, which serve at the same time as mechanical retention for the conveying trough 18 and as power lead to the bulk material 20 and which are marked 22 to 29 in the figure. The superposed supporting stringpieces 22 to 25 and 26 to 29, respectively, are electroconductively connected to an electrode terminal 34, 35 via at least one bus bar 32, 33 respectively.

Associated with the conveying trough 18 with the inserted contact screws, intended to be connected as cathode in this form of realization, are anodes, of which only three are shown in the figure for simplification, marked 37 to 39. Anode 37 is fastened on the vessel wall 6, and the anodes 38 and 39 are fastened on the cover of an anode shaft.

A feed shaft, merely indicated in the figure, is marked 41, and a discharge shaft, 42. After one or more circulations inside the electrolyte 12, the bulk material 20 can be returned to the beginning of the conveying trough 18 by actuation of a mechanical switch, which is represented in the figure merely as a flap 44 for simplification, and which can be operated from the outside by a drive 45.

Figure 2:
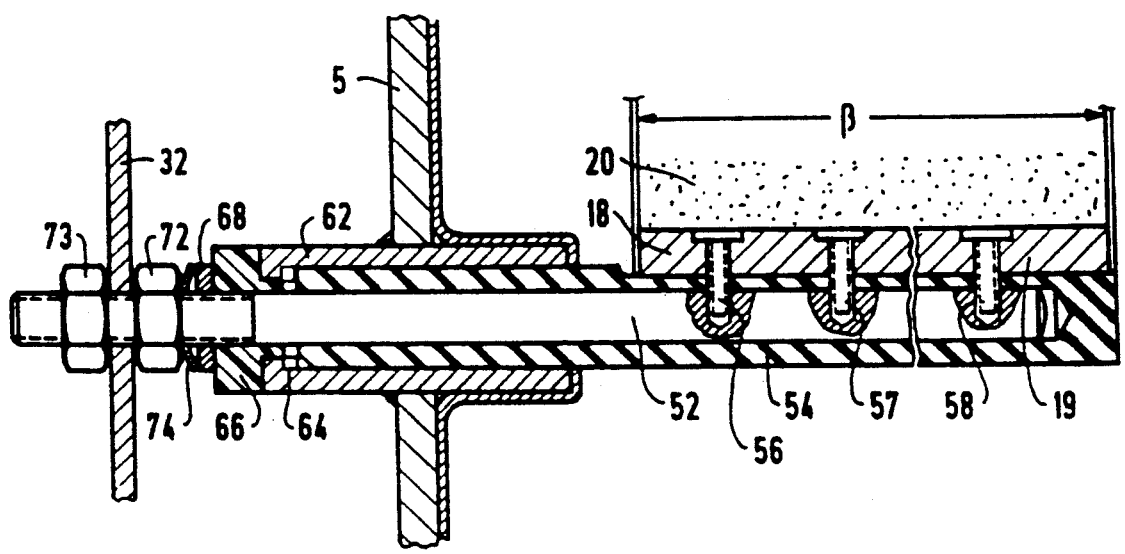
FIGS. 2 and 3 show a form of realization of a supporting stringpiece according to the invention, which serves at the same time as power lead.

In the form of realization per FIG. 2, a supporting stringpiece is electroconductively connected, e.g. screwed, to the bus bar 32 via the contact shaft 52, and is stably supported in a welded-on coupling in the sidewall 5 of the central pipe 2. For current conduction and at the same time for mechanical strength serves a contact shaft 52 of electrically conductive material with a preferably profiled surface, made for example of metal, in particular high-strength steel. The profile of the contact shaft 52 is not shown in the figure for simplification. The contact shaft 52 is provided with an electric insulation 54, which may consist for example of plastic and in connection with a profiled surface preferably of a laminated cloth wrap HGW. The resin-impregnated fabric is wrapped in known manner around the contact shaft, thereafter pressed and then hardened.

Passing through the bottom 19 of the conveying trough 18 and the insulation 54 are several contact screws which serve to attach the conveying trough 18 on the contact shaft 52 and at the same time establish an electric connection between the contact shaft 52 and the bulk material 20. At a width of the conveying trough 20 of for example B =300 mm, for example six contact screws for the supporting stringpiece may be provided, of which only three are shown in the figure for simplification, marked 56 to 58. For proper current distribution to the bulk material 20 these contact screws 56 to 58 may preferably have enlarged heads inserted in the conveying trough. These screws are generally provided with a safety element not shown in the figure, so that they will not loosen due to the vibration of the conveying trough 18. The contact shaft 52 with its insulation 54 and a seal ring 64 is inserted in a coupling 62, which is made of metal, e.g. steel, and is undetachably connected with the sidewall 5 of the central pipe, for example by welding. This coupling 62 is provided with a coating 61, which may preferably consist of a self-hardening plastic, in particular phenolic resin, and which covers also the sidewall 5 of the central pipe. Serving for electric insulation of the contact shaft 52 against the central pipe 2 and as abutment is a bushing 66 made of mechanically strong, electrically insulating material, preferably glass fiber-reinforced plastic GFK. By means of a first nut not specifically marked the supporting stringpiece is screwed to the sidewall 5 via the contact shaft 52. Subsequently, with the second nut, also not marked, the stringpiece is connected to the bus bar 32. Between the shim 68 and the nut 72 preferably a cup spring 74 may further be provided. In this form of realization, on the one hand the conveying trough 18 is fixed in the sidewall 5 of the central pipe 2 and, on the other hand, the electric contact between the bus bar 32 and the bulk material 20 is established.

Figure 3:
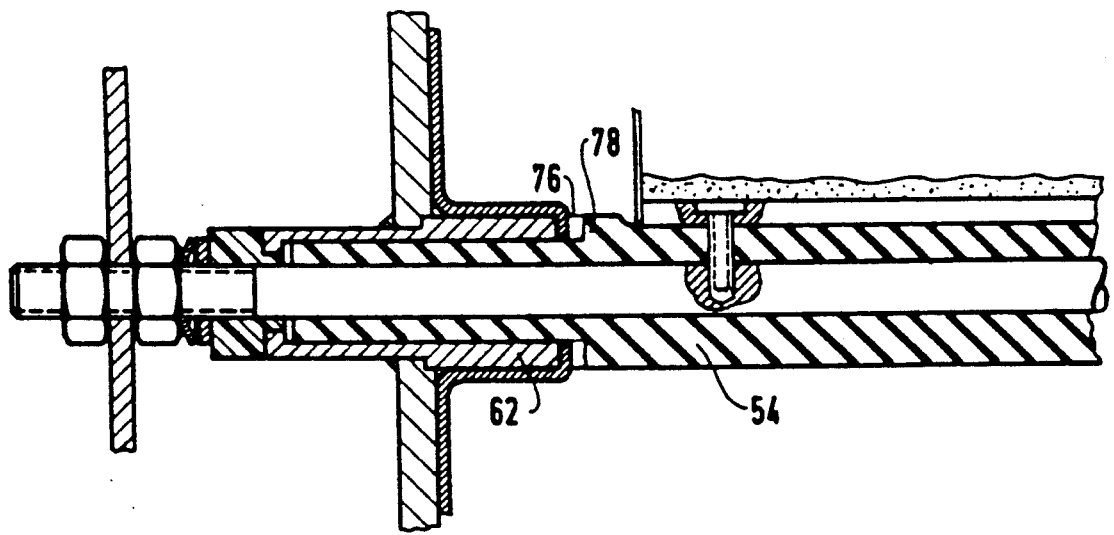

In a special form of realization of the supporting stringpieces 22 to 29, a seal ring 76 may also be disposed closer to the electrolyte 12, in particular on the end face of coupling 62 toward the electrolyte 12, as illustrated in FIG. 3. For this purpose the insulation 54 is provided with an annular shoulder 78, which serves as abutment. In this form of realization the electrolyte 12 can no longer penetrate into the annular gap between the insulation 54 and the inside wall of coupling 62. In this case the inner seal ring 64 is unnecessary.

What is claimed is:

1. A device for electrolytic surface treatment of bulk material, comprising: a vibrator conveyor having a conveying trough; a central pipe; supporting stringpieces, for mechanically attaching the conveying trough on the central pipe and for transmitting current to a cathode, said supporting stringpieces forming an electrically conducting contact shaft which is electrically insulated from the central pipe and from electrolyte; and contact bolts for attaching the conveying trough to the supporting stringpieces and for transmitting current from the contact shaft to the bulk material.

2. The device according to claim 1 wherein the contact shaft has a profiled surface and a wrapped covering of a laminated cloth HGW.

3. The device according to claim 2 wherein insulation material for the contact shaft is surrounded at one end by a coupling, said coupling being undetachably connected with the central pipe and being associated with a bushing of electrically insulating material as an abutment, with a seal being disposed between the bushing and the insulation material.

4. The device according to claim 3 wherein the coupling has an inner shoulder at an end thereof toward the bushing, and wherein a seal ring is disposed between the inner shoulder and an end face of the insulation material.

5. The device according to claim 3 wherein the insulation material has an annular shoulder, and wherein a seal ring is disposed between the annular shoulder and an end of the coupling toward the electrolyte.

* * * * *